Patented Mar. 10, 1936

2,033,495

UNITED STATES PATENT OFFICE 2,033,495

ANTHELMINTIC

Charles C. Taylor and Arthur L. Galloway, Louisville, Ky., assignors to Tobacco By-Products and Chemical Corporation, Louisville, Ky., a corporation of Delaware No Drawing. Application September 7, 1933, Serial No. 688,461

7 Claims. (Cl. 167—53)

This invention relates to an anthelmintic particularly effective for intestinal round worms in poultry.

It has long been known that intestinal round worms are located principally, if not entirely, in the small intestines of poultry and it has been believed heretofore that they existed practically only toward the lower or posterior portion of the small intestines.

It has been known that the food as it travels through the alimentary tract to the beginning of the small intestine is subjected to an acid reaction and after reaching the small intestine is subjected to an alkaline reaction, the alkalinity being less at the entrance end and increasing toward the lower or posterior end of the small intestine.

Many attempts have been made heretofore to provide a remedy for intestinal round worms in poultry, which would not react in a neutral or acid environment but which in an alkaline environment would set free a vermicide. This plan was followed because of the toxic effects on the poultry of those vermicides which were effective, this toxic effect being less where the vermicide was released only in the alkaline portion of the alimentary tract. It was known that nicotine is a deadly vermicide, but also that it can be highly toxic to poultry, especially in the crop and stomach.

It has been proposed to overcome the dangers in the use of nicotine as a vermicide, by combining it with an adsorbent which would retain the nicotine in a neutral or acid environment, and release it only in an alkaline environment, and much research has been done to find such an adsorbent. Although some degree of success has been obtained in this way, the final results have not been satisfactory, for the reason that no adsorbent had been found which would hold perfectly a sufficiently large percentage of nicotine so as to permit the administration of a truly effective dose of nicotine without releasing some in the acid environment of the alimentary tract of a fowl. Hence, it has been found that such prior remedies do have same toxic effects on the poultry treated, to the extent at least of putting them off their feed for a while, thus interfering with fattening or egg production.

To attain even this result it has been necessary to restrict the amount of nicotine in each dose of the remedy to such an extent that the efficiency of the dose as a vermicide is also reduced. Consequently, with all the anthelmintics of this kind, so far as known to applicant, the results were not completely salsfactory, for several reasons, as follows:

The vermicidal action was not sufficient to entirely free the poultry from worms with one dosage, thereby either leaving the poultry to some extent infested, from the worms retained, if only one dosage was employed, or necessitating repetition of the treatment with all the consequent difficulties and disadvantages of repeated handling, and continuous cleaning of the range if reinfestation was to be avoided.

With the prior remedies using nicotine and the adsorbents previously known, if the nicotine dosage was sufficient to entirely free the poultry at one treatment, the adsorbent materials hitherto employed were not perfect as adsorbers and therefore did release some nicotine in the acid portion of the alimentary tract and while this might not be enough to kill the poultry it was enough to check the appetite, thereby resulting in a reduction in the amount of food taken with a consequent failure to increase in weight, and a loss of egg production. Where the nicotine dosage was reduced, and repetition of the treatment resorted to, there was always a danger of reinfestation on account of the longer time of treatment, unless repeated and frequent cleaning of the premises be done, with resulting increase of labor. With all such previously known anthelmintics for poultry, it was recognized that the dose of nicotine must be kept in very narrow limits, to avoid injuring the poultry by too much, and yet not to have so little as to be insufficient for the purposes intended. Consequently, it has been considered necessary heretofore, to administer the remedy in very exact individual doses, usually in the form of tablets, capsules or pills, and it has been recognized in the art that it was not possible to give what is called "flock treatment", that is to say, to mix the vermicide with the feed for the flock and depend upon each fowl eating the same amount of feed, and therefore vermicide, as any other fowl, since with such prior nicotine remedies there could be allowed only a most restricted variation from the proportions required for the correct dose.

It is the object of the present invention to provide an anthelmintic for poultry, particularly suitable for the removal of intestinal round worms, which will avoid the objections hereinbefore pointed out.

With this object in view and some others which will be obvious to those skilled in the art from the description hereinafter, the most important feature of the invention consists in employing a enough to kill intestinal round worms as the anthelmintic travels through the small intestine. Therefore, at the completion of the single treatment the fowl is completely freed from intestinal round worms, and only a single cleaning up of the premises will be required to reduce the hazard of reinfestation.

While the specific description of the process of making the anthelmintic gives proportions which will result in a product carrying about 5% nicotine figured as free nicotine, it is to be understood that the invention is not limited to this proportion only. Where it is desired to use the worm powder mixed with the feed as a prophylactic, the nicotine may be reduced to about 3% and beneficial results as a prophylactic thereby obtained. Furthermore, where desired, the nicotine may be increased as high as 8%. However, to insure the union of such a large amount of nicotine with the starting material, it is advantageous to prepare a solution of the nicotine salt having a nicotine concentration above 8%, for example, 10%, in sufficient quantity to immerse the starting material therein, and then allow said material to remain immersed for a considerable time, the action apparently being one involving mass action. Then the material is filtered and dried. The filtrate, of course, can be saved, strengthened by the addition of further nicotine salt, and used again.

The product made in this way contains a high percent of nicotine, for example, up to 8½%.

It will be seen that the anthelmintic of the present invention can be made to carry from 3% to 8½% of nicotine figured as free nicotine, and yet will retain said nicotine in an acid or neutral environment, while releasing it promptly in an alkaline environment.

What is claimed is:

1. An anthelmintic composition containing a nicotine alumino-penta-silicate.

2. An anthelmintic composition containing the reaction products obtained by acting on a complex salt of alumino-penta-silicic acid containing alkalis and alkaline earths, with a nicotine salt of an acid capable of combining with alkalis and alkaline earths.

3. An anthelmintic composition consisting of the reaction products obtained by reacting with a nicotine salt, a derivative of an alumino-silicic acid which corresponds to the formula $$3Al_2O_3.15SiO_2.xH_2O$$

where $x$ may have about the value 9 in the said derivative material when partly dried and must have about the value 3 as a minimum.

4. An anthelmintic composition consisting of the reaction products of 1 part nicotine salt of 40% nicotine strength and 7 parts of a natural alumino-silicate in which the ratio of $SiO_2$ to $Al_2O_3$, by weight, is 3, said anthelmintic being a fine powder.

5. An anthelmintic composition comprising a nicotine salt of alumino-penta-silicic acid, the nicotine figured as free nicotine constituting from 3 to 8 percent by weight of the composition.

6. The process of making an anthelmintic powder which consists in finely comminuting and drying at about 100° C. until it reaches constant weight, a natural alumino-silicate of alkali and alkaline earths in which the ratio of $SiO_2$ to $Al_2O_3$ by weight is about 3, then adding a concentrated aqueous solution of a nicotine salt in such proportion as to provide three to eight and one-half percent of actual nicotine in the mixture, and then grinding the mixture until it is a fine powder.

7. As a new composition of matter, a complex salt of penta-silicic acid containing chemically bound nicotine, said salt retaining said nicotine when subjected to a neutral or acid environment, and releasing it when subjected to an alkaline environment, said salt having parasiticidal properties.

CHARLES C. TAYLOR.
ARTHUR L. GALLOWAY.

cule, the ratio of $SiO_2$ to $Al_2O_3+Fe_2O_3$ is still above 2.5, viz: about 2.6 and hence, higher than the corresponding ratio for those so-called bentonites which are entirely unsuitable for applicants' purposes.

With material of the type designated above, and a suitable nicotine salt, anthelmintics for poultry may be made in two forms, viz: (1) in pellets each containing one dose and, of course, requiring the individual handling of each fowl and the administration by force of the pellet, in most cases the single dose being sufficient to completely free the fowl from intestinal round worms, (2) in the form of a powder which can be thoroughly admixed with mash or ground feeds and will be eaten by the fowl with the food. This is because the powder is odorless and tasteless and where desired may be colored to imitate the color of the feed. In administering the anthelmintic in powder form, it is advisable first to determine the amount of feed which the fowl will clean up promptly at each feeding and thereafter to thoroughly mix enough of the anthelmintic powder with the said determined amount of feed to constitute one effective dose of nicotine.

Owing to the effectiveness of the present anthelmintic, it has been found that the dosage of nicotine is not so critical as has been the case with prior anthelmintics, wherefore it has become possible to treat a considerable flock simultaneously by dosing the whole amount of feed for the flock, thus depending upon each fowl in the flock eating about the same amount of feed as any other fowl in the flock. In this case it is important to provide plenty of room for all the flock to eat without crowding one another.

Where the flock cleans up all the treated feed at one feeding, practice has shown that there will be a near enough approach to a uniform dosage of each fowl to accomplish the desired results.

The nicotine salt most generally employed is nicotine sulphate but in place of the sulphate the chloride or other suitable salt may be employed.

Since, however, the nicotine sulphate is usually more readily obtained than any other nicotine salt, the description hereinafter as to the method of preparing the anthelmintic, will refer specifically to the use of nicotine sulphate, it being understood that where the other salts are employed the formula will be changed to give the same percentage of nicotine figured as free nicotine.

The worm powder is made by comminuting to 100 mesh or finer and then drying a starting material having an analysis equivalent to that hereinbefore set forth, at a temperature of about 100° C. until it reaches equilibrium, that is constant weight, at that temperature. Then a suitable nicotine salt, for example nicotine sulphate of 40% nicotine strength, is added to the starting material in the proportion of 12½ pounds of said nicotine sulphate to 87½ pounds of the dried starting material, while stirring the mixture roughly. The mixture is then ground in a ball mill until the resultant product is homogeneous. This finely ground product will feel and appear dry although it contains the water which was present in the nicotine sulphate, and which may be combined as water of constitution. It constitutes the finished worm powder. This may be put up in suitable containers, which, most advantageously, are water-proof. Sealed water-proof paper or cellophane bags, cartons, cans or bottles may be used as containers.

In administering this anthelmintic powder, it is mixed with the feed in the proportion of approximately 1.15 grammes of powder for each fowl, the weight of feed per fowl being that which the fowl will clean up well at one feeding, which should be determined by test before the treatment commences. Where it is desired to color the powder to match the color of the feed, a small amount of an inert coloring material, such as a ferric oxide, may be added to the starting material before the grinding commences, or a short time before the grinding is completed. The said coloring material should be added in the proportion of 48 ounces per 12½ pounds of nicotine sulphate, or 3% by weight of the whole.

The proper drying of the starting material at about 100° C. until no more water will come off at that temperature is important. One reason is that it prevents balling-up and sticking of the material in the ball mill, and another reason is that in this way a product can be made in which a maximum amount of nicotine is taken up and chemically combined with the alumino-pentasilicic acid, the nicotine displacing an equivalent of sodium and alkaline earths, which combine with the acid of the nicotine salt, forming corresponding salts of sodium and the alkaline earths. These are not washed out but stay with the nicotine compound and serve as laxatives.

To prepare the anthelmintic for individual dosage, the above-described worm powder may be weighed and put up in capsules, if desired. However, it is best made into hard pellets or tablets of about ⅜" x ⅛" size. This is done by moistening the worm powder and then drying the mixture at a relatively low temperature, for example, about 60° C. It is an advantage of this material that no binder is necessary because when compressed it is adhesive enough for the purpose of making granules and tablets. This dried material is then granulated by passing it through a suitable granulating machine. The product in a fine granulated condition is fed to the usual tablet machine where it is compressed into tablets, or pellets, of the desired weight and size. Some stearic acid may be mixed with the dried material, if desired, though not essential, this being done after granulating.

It is to be noted that the anthelmintic carries all the reaction products of the nicotine salt and the complex alumino-silicates. During the reaction there is a noticeable rise in temperature.

Tests of the anthelmintic constituting the present invention indicate that one of the principal causes of lack of success with the prior nicotine anthelmintics was the fact that intestinal round worms infest the small intestines; and since the adsorbent material heretofore used would not positively retain in a neutral or acid environment a heavy enough dose of nicotine, the proportion of nicotine was reduced, with the result that in the small intestine, with its alkaline environment, the nicotine set free from the adsorbent was too dilute to destroy all the round worms located there. Hence, the fowl would remain infested from the few round worms retained in the small intestine. With the present invention, the nicotine is so well retained through the acid environment of the alimentary tract that practically all of the nicotine which is administered is delivered to the small intestine and gradually released there. This gradual release allows a larger total dose of nicotine to be given without injury to the fowl, since at no time is there present sufficient soluble nicotine to severely shock the central nervous system of the bird yet always enough to kill intestinal round worms as the anthelmintic travels through the small intestine. Therefore, at the completion of the single treatment the fowl is completely freed from intestinal round worms, and only a single cleaning up of the premises will be required to reduce the hazard of reinfestation.

While the specific description of the process of making the anthelmintic gives proportions which will result in a product carrying about 5% nicotine figured as free nicotine, it is to be understood that the invention is not limited to this proportion only. Where it is desired to use the worm powder mixed with the feed as a prophylactic, the nicotine may be reduced to about 3% and beneficial results as a prophylactic thereby obtained. Furthermore, where desired, the nicotine may be increased as high as 8%. However, to insure the union of such a large amount of nicotine with the starting material, it is advantageous to prepare a solution of the nicotine salt having a nicotine concentration above 8%, for example, 10%, in sufficient quantity to immerse the starting material therein, and then allow said material to remain immersed for a considerable time, the action apparently being one involving mass action. Then the material is filtered and dried. The filtrate, of course, can be saved, strengthened by the addition of further nicotine salt, and used again.

The product made in this way contains a high percent of nicotine, for example, up to 8½%.

It will be seen that the anthelmintic of the present invention can be made to carry from 3% to 8½% of nicotine figured as free nicotine, and yet will retain said nicotine in an acid or neutral environment, while releasing it promptly in an alkaline environment.

What is claimed is:

1. An anthelmintic composition containing a nicotine alumino-penta-silicate.

2. An anthelmintic composition containing the reaction products obtained by acting on a complex salt of alumino-penta-silicic acid containing alkalis and alkaline earths, with a nicotine salt of an acid capable of combining with alkalis and alkaline earths.

3. An anthelmintic composition consisting of the reaction products obtained by reacting with a nicotine salt, a derivative of an alumino-silicic acid which corresponds to the formula $$3Al_2O_3.15SiO_2.xH_2O$$

where $x$ may have about the value 9 in the said derivative material when partly dried and must have about the value 3 as a minimum.

4. An anthelmintic composition consisting of the reaction products of 1 part nicotine salt of 40% nicotine strength and 7 parts of a natural alumino-silicate in which the ratio of $SiO_2$ to $Al_2O_3$, by weight, is 3, said anthelmintic being a fine powder.

5. An anthelmintic composition comprising a nicotine salt of alumino-penta-silicic acid, the nicotine figured as free nicotine constituting from 3 to 8 percent by weight of the composition.

6. The process of making an anthelmintic powder which consists in finely comminuting and drying at about 100° C. until it reaches constant weight, a natural alumino-silicate of alkali and alkaline earths in which the ratio of $SiO_2$ to $Al_2O_3$ by weight is about 3, then adding a concentrated aqueous solution of a nicotine salt in such proportion as to provide three to eight and one-half percent of actual nicotine in the mixture, and then grinding the mixture until it is a fine powder.

7. As a new composition of matter, a complex salt of penta-silicic acid containing chemically bound nicotine, said salt retaining said nicotine when subjected to a neutral or acid environment, and releasing it when subjected to an alkaline environment, said salt having parasiticidal properties.

CHARLES C. TAYLOR.
ARTHUR L. GALLOWAY.